(12) United States Patent
Hiisilä

(10) Patent No.: US 9,611,044 B2
(45) Date of Patent: Apr. 4, 2017

(54) METHOD AND AN APPARATUS TO SHOOT AN OBJECT FROM A FLYING APPARATUS

(71) Applicant: Skycat Oy, Forssa (FI)

(72) Inventor: Henri Hiisilä, Forssa (FI)

(73) Assignee: SKYCAT OY, Forssa (FI)

( * ) Notice: Subject to any disclaimer, the term of this patent is extended or adjusted under 35 U.S.C. 154(b) by 0 days.

(21) Appl. No.: 15/111,147

(22) PCT Filed: Oct. 12, 2015

(86) PCT No.: PCT/FI2015/000036
§ 371 (c)(1),
(2) Date: Jul. 12, 2016

(87) PCT Pub. No.: WO2016/059286
PCT Pub. Date: Apr. 21, 2016

(65) Prior Publication Data
US 2016/0332738 A1    Nov. 17, 2016

(30) Foreign Application Priority Data

Oct. 17, 2014    (FI) ...................................... 20140280

(51) Int. Cl.
*B64D 17/00*    (2006.01)
*B64D 19/00*    (2006.01)
(Continued)

(52) U.S. Cl.
CPC ............ *B64D 17/70* (2013.01); *B64C 39/024* (2013.01); *B64D 1/12* (2013.01); *B64D 17/64* (2013.01);
(Continued)

(58) Field of Classification Search
CPC .......... B64D 17/70; B64D 1/12; B64D 17/64; B64D 25/00; B64C 39/024; B64C 2201/128; B64C 2201/146; B64C 2201/185
See application file for complete search history.

(56) References Cited

U.S. PATENT DOCUMENTS 3,316,531 A    4/1967    Baker
6,460,445 B1   10/2002   Young et al.
(Continued)

OTHER PUBLICATIONS

Finnish Patent and Registration Office Search report of FI20140280 dated Jun. 2, 2015.

*Primary Examiner* — Philip J Bonzell
(74) *Attorney, Agent, or Firm* — Berggren, Inc.

(57) ABSTRACT

The object of this invention is a method to shoot an object from a flying apparatus. Into an flying apparatus, into certain part of it, like a container that consists at least of a bottom and a shell a spring will be placed, like a push spring that has been loaded in a tense state and that is locked in this position using a fixing organ and further there will be put as an extension of the spring an object to be shot out from the flying apparatus. The fixing organ is thread, metal cord, bar, strip, rope, line, or some combination of these and tension strength (T) is greater than the tension load of the push force (F) to the mentioned fixing organ. the tension strength (T) of the fixing organ is weakened to be less than the mentioned tension load by heating, burning, or melting the mentioned fixing organ by electric energy when the fixing organ breaks, the spring expands into the direction of the object and the push force (F) pushes the object out of the container and off the flying apparatus. The apparatus that is used in the present method is also an object of the invention.

8 Claims, 2 Drawing Sheets

(51) Int. Cl.
    *B64D 17/70*     (2006.01)
    *B64D 1/12*     (2006.01)
    *B64D 25/00*     (2006.01)
    *B64C 39/02*     (2006.01)
    *B64D 17/64*     (2006.01)

(52) U.S. Cl.
    CPC ........ *B64D 25/00* (2013.01); *B64C 2201/128* (2013.01); *B64C 2201/146* (2013.01); *B64C 2201/185* (2013.01)

(56) References Cited

U.S. PATENT DOCUMENTS

| | | | |
|---|---|---|---|
| 6,565,041 | B1 | 5/2003 | Young et al. |
| 2010/0257983 | A1 | 10/2010 | Jordan et al. |
| 2014/0014770 | A1 | 1/2014 | Teller et al. |

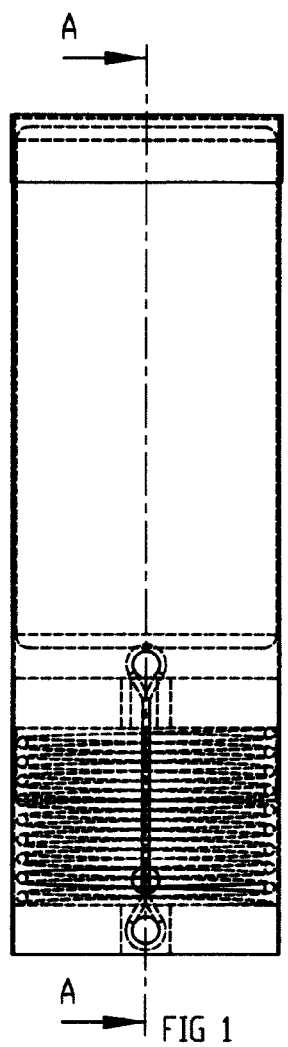
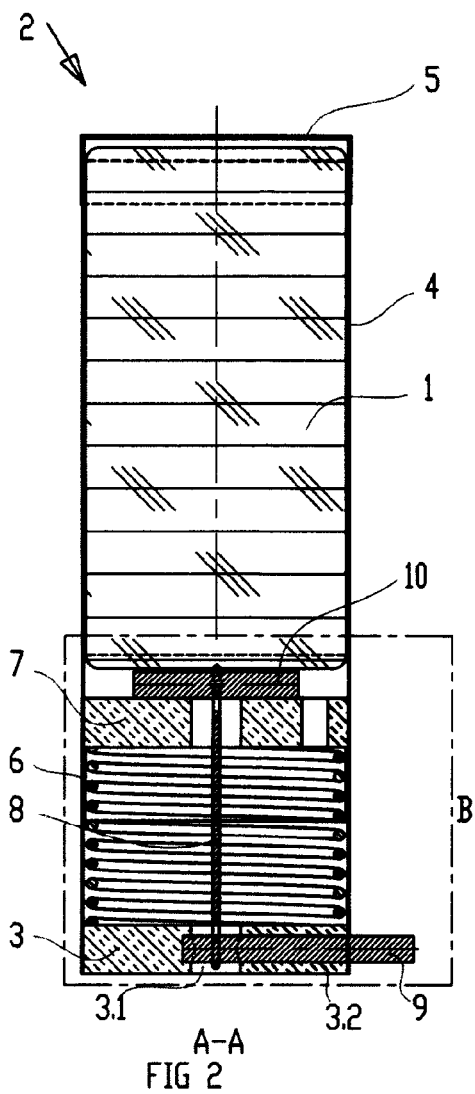
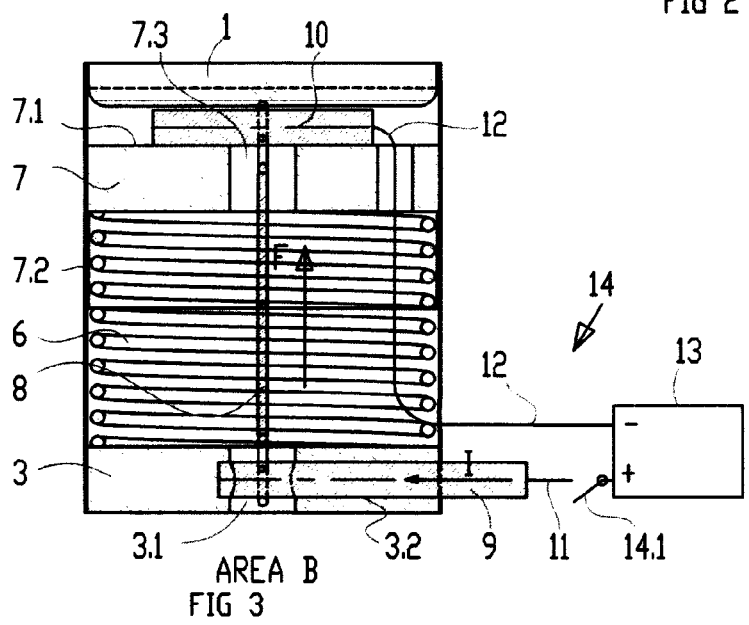
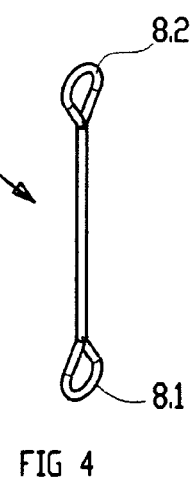
FIG 1
FIG 2 A-A
FIG 3 AREA B
FIG 4

500
METHOD AND AN APPARATUS TO SHOOT AN OBJECT FROM A FLYING APPARATUS

PRIORITY

This application is a national entry of the international application PCT/FI2015/000036 filed on Oct. 12, 2015 and claiming priority of the Finnish national application number 20140280 filed on Oct. 17, 2014 the contents of both of which are incorporated herein by reference.

FIELD AND BACKGROUND

The object of this invention is a method and an apparatus to launch an object from a flying apparatus. A push spring that has been loaded or will be loaded in tense state is put in certain place, like a container including at least a bottom and a shell, in the flying apparatus and the spring is locked in this state with a fixing organ and furthermore, as an extension of the spring there is placed in the container the object to be shot from the flying apparatus.

The usage possibilities of the invention are such different flying and remote controlled equipments like for instance multicopters and miniature planes where there might be need to shoot a certain object during the flight.

As an example of this kind of launchable object a parachute can be mentioned or so called pilotchute the duty of which is to draw out the actual parachute that has been fixed to it. Shooting out the parachute is needed when a defect occurs in the flying apparatus and there is the danger that it falls to the ground. In situations where this flying apparatus is flying above people or a residential area it is especially important that it can be landed safely in defect situations with the help of a parachute. It is of cause reasonable to equip the apparatus with a parachute in order to get the flying apparatus down intact in problem situations.

The before described parachute or its pilot-chute is known to be fixed to the flying object in such a way that it can be shot out when needed very quickly loose from the flying apparatus to hold it up and to slow down its fall. One known solution to take care of this is to put to the flying apparatus a container with a bottom and a shell and to load at the bottom of this container a push spring with the help of a fixing organ and to put a folded parachute to the container as an extension of this push spring. When the need to shoot the parachute out comes the fixing organ is disconnected from the spring and then the spring power of the disconnected spring pushes the parachute out from the container and clear from the flying apparatus. The parachute is fixed using bands, ropes or corresponding organs to the flying apparatus and thus prevents the flying apparatus from falling quickly.

The disconnecting of the before mentioned fixing organ can be done for example by using different kind of mechanical shooting equipments where certain movement of certain part disconnects the spring. This movement can be caused by remote control or automatically for example by acceleration, position or pressure sensor or something like that.

Another known way to shoot the parachute out is to explode behind it a $CO_2$ charge when the generated pressure pushes the parachute out from its storage place.

The before mentioned techniques are used in the field generally.

To discharge an explosion with the known technique has its greatest disadvantage there that very many private noneprofessionals and hobby communities are operating in the field and the handling of explosives includes always danger factors. Additionally, the usage of the explosives is very strictly regulated with different rules and thus it is very difficult to use this technique without breaking acts and regulations.

A big disadvantage of the methods basing on the mechanical shooting gear can be seen to be their complexity and high purchase prices and the problems of the reliability of operation.

SUMMARY

The meaning of this invention is to achieve such a method and apparatus to shoot out an object from a flying apparatus that disadvantages of the known technology are avoided. It is characteristic for the method according to the invention what has been presented in the characterizing part of the claim 1 and the apparatus according to the invention what has been presented in the characterizing parts of the claim 3.

The greatest advantages of the invention can be seen that the method and the apparatus according to it are very simple and of a low price to realize and that they are very reliable in use.

In this document, the term container means the place, the organs limiting it and other controlling elements of the space where the object to be shot out is stored. The shell means a certain other wall part of the before mentioned space except the bottom. The terms containing the words under and upper refer to the drawings of this application but they do not define the only usage position of the apparatus according to the invention, instead, the apparatus is operational in different positions. The resistance means such an electric resistance that changes the electricity into heat energy.

DESCRIPTION OF THE DRAWINGS

The invention is described in the enclosed drawings where

FIG. 1 presents one apparatus according to the invention ready to be used and seen from outside, FIG. 2 presents a lengthwise cross-section in the middle of the before mentioned apparatus, FIG. 3 presents the apparatus of the FIG. 2 in place B seen more closely, FIG. 4 presents one application of the fixing organ of the apparatus according to the invention.

DETAILED DESCRIPTION

Figure 5:
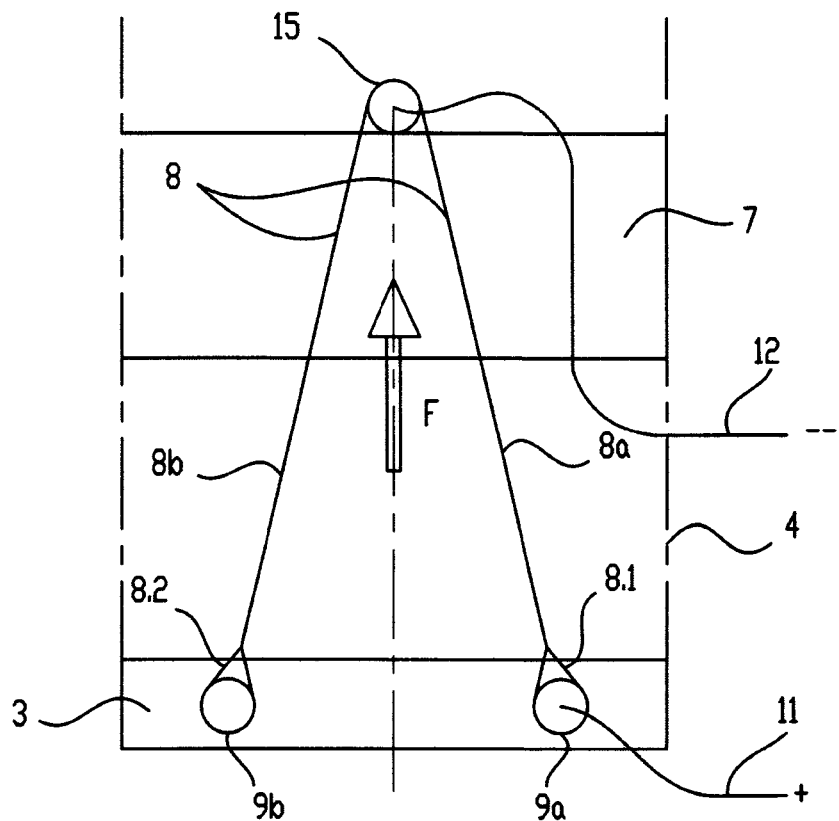
FIG. 5, presents another application of the fixing organ.

Next, a favorable application structure and operation of the invention is described referring to the before mentioned figures.

In FIGS. 1-3, there is a schematic and as an example one apparatus according to the invention. The apparatus has been presented in these figures ready to be used and together with it there has been presented also the object 1 to be shot out. The object 1 is in this example a parachute and it can be seen in FIG. 2 that it has been put inside the container 2, in its upper part. The bottom 3 of the container is round and made of isolating poorly electricity conducting material of the shape of a disc and it has in its center an opening 3.1 in the direction of its middle axis and there is a hole 3.2 in its edge that reaches to the mentioned opening 3.1 and even a bit to the other side of it. The container has a cylinder shell 4 and in this example a lid 5 has also been placed to the upper end of the shell. There is a spring 6 inside the container that is in this example a helical spring and there has been installed against the upper end of it a push organ 7 of the shape of a piston, round of its diameter, slide adapted to the shell which organ also has been made of isolating and thus poorly electricity conducting material. The push organ composes of an apron 7.2 reaching between the push surface 7.1 and shell 4 and spring 6 and in the middle of it there is an opening 7.3 to the direction of the container middle axis. The spring 6 is a push spring and it has been pressed low against the bottom 3 of the container and locked to this tense position using a fixing organ 8 so that the mentioned fixing organ combines together with the first locking organ 9 and the second locking organ 10 the bottom 3, the spring 6 and the push organ 7. In this example, the fixing organ 8 is (FIG. 4) a thin metal cable and there are loops 8.1, 8.2 at their ends. The first locking organ 9 is a metal pivot pushed into the hole 3.2 and the other locking organ 10 is metal pivot that has been installed against the push surface 7.1 of the push organ. The loop 8.1 in the lower end of the fixing organ 8 reaches round the first locking organ 9 and the other loop 8.2 at the upper end correspondently round the second locking organ 10 and thus the spring 6 is locked in stress state between the bottom 3 and the push organ 7 and thus the push force F causes a corresponding tensile stress, in this example to the metal cord that is vertical and operating as the fixing organ 8. The fixing organ 8 has been dimensioned so that its tensile strength T that is the tensile strength of its material divided by the area unit (N/mm$^2$) multiplied by its total area (mm$^2$) is greater than the expulsive force F of the ready to be used spring.

In the apparatus according to the invention, there has been connected a current wire 11 to the first locking organ 9 and a current wire 12 to the second locking organ 10. The mentioned current wires have been connected to the current supply 13 of the flying apparatus, like an accumulator or a battery. The created electric circuit 14 that consists of the mentioned current wires, locking organs, fixing organs, and current supply has been equipped with a disconnector 14.1 that keeps the electric circuit disconnected in normal situations. The electric circuit 14 can be connected with a remote control device or with an automatic device the way that has been described before. The short circuit has been prevented with the material selection of the materials for the other parts that are in contact with the electric circuit in the way that has been described before.

The method according to the invention works so that when an object 1, like a parachute is desired to be shot out from the flying apparatus the disconnector 14.1 is closed with remote control or it gets closed by a signal coming from for example the acceleration, position, or pressure sensor or a corresponding device and then current is created in the electric circuit 14. As the current goes through the fixing organ 8 the fixing organ metal cable operates as an electric resistance and the electric energy changes there into heat and the temperature of the fixing organ rises. The current intensity I and voltage U have been dimensioned so that the temperature of the fixing organ 8 rises very quickly so much that also the tensile strength of the material gets quickly weak and so much that the push force F (N) of the spring 6 gets higher than the tensile strength T (N) of the fixing organ. The mentioned tensile strength T is thus the tensile strength value (N/mm$^2$) of the material of the breaking point multiplied by cross cut area (mm$^2$) in question. In this case, the fixing organ 8 breaks or gets melted and the push force F of the spring gets released and the spring pushes the push organ 7 in front of it and the push organ pushes the object 1 in front of it and consequently the object pushes the loosely in its place situating lid 5 away from its place and the object gets shot out of the container 2 and out of the flying apparatus. If the object 1 is a parachute that is fixed to the flying apparatus this parachute gets opened and limits the falling speed of the flying apparatus in a desired way.

The flying apparatus can be equipped for the next flight with a reloaded spring 6 in the container 2, with a new fixing organ 8 and repacked object 1.

The object 1 can be something else than a parachute. As an example, a serpentine reel or a group of these reels can be used. Also many other objects to be shot out of a flying apparatus can be in question.

The container 2 can be dimensioned always according to the circumstances to be of a suitable size or shape. In the example before, it has been dimensioned suitable for a parachute, but it can also be made of some other shape. Fixing the container to the flying apparatus can be made by any method of the known technology so that the object that is thrown has a free way to the outside air. In some cases, the container can also be without the lid.

The bottom 3 has also many ways to be realized. It is central for it that the locking organ 8 can be supported to it either directly or through a support organ 9. One alternative that can be mentioned is the construction where locking organ 9 leans against the under surface of the bottom 3 and the fixing organ reaches it going through the whole bottom. In some cases, the fixing organ 8 can be fixed directly to the bottom and then the wire cord 11 is fixed directly to it.

The spring 6 can in some cases be made differently from the above presented using for example the principle of a leaf spring. It is central that the push force F is directed into the direction of the object 1 to be shot out.

The push organ 7 can be made in different variations but, however, always so that it is directed sufficiently well into the right direction pushed by the spring push force F. In the example before, the apron 7.2 of the push organ directs the same way as a piston apron to make it to move into the direction of the length axis of the container. The fixing organ 8 can in some cases be fixed also directly to the push organ 7, when the electric cable 12 is fixed directly to the fixing organ 8. In some cases, the push organ 7 can also be an end of the spring 6.

The fixing organ 8 can be made in many different ways. It can be a wire, metal cord, bar, strip or a corresponding organ or a combination of the before mentioned or any object that is or that has in it an electric resistance operating as a fuse or through which the electricity is conducted. The fixing organ can also be made so that only a part of it belongs to the electric circuit 14, in which case the current is conducted only through this part and the breaking or melting happens then in this mentioned part. As the material of the fixing organ, it is possible to use steel, copper metal, aluminum or any other material that is sufficiently strong and electricity conducting.

The locking organs 9, 10 can be made in many different known ways. It is not necessary that they belong to the electric circuit 14 if the circulation of the electricity via the fixing organ is arranged in some other way than via the locking organ. If the locking organs belong to the electric circuit 14 the same rules apply to their material selection as before in the case of fixing organ has been told.

It is possible to arrange the electric circuit 14 in the apparatus according to the invention also in such a way that the current goes to the fixing organ 8 that is operating as a fuse or from there further along the spring 6. In this case, when dimensioning the spring it is necessary to take into account the rise of the temperature caused by the current and through that the weakening of the strength of the material.

One application of the invention is a solution where the bottom 3, tense spring 6, push organ 7 and the fixing organ 8 make together a prefabricated capsule that is placed inside the shell 4 and supported to its place against its lower part. In another similar solution, the bottom 3 in the capsule can be replaced by a separate laminar support part that is supported under the spring in which case the prefabricated capsule is placed against the bottom 3 of the container. After this, the electric wires 11, 12 are connected to the apparatus so that the fixing organ 8 or a part of it becomes a part of the electric circuit 14.

It has been described in the FIG. 5 one such application of the invention where the fixing organ 8 is a metal cord or a corresponding organ that has been fixed to the bottom 3 in two places through the locking organs 9a, 9b and to the pushing organ 7 in one place through the locking organ 15. The fixing organ makes in this case the so called pulley setting so that its first part 8a advances from the locking organ 9a to the locking organ 15 and after going round it its second part 8b advances from there to the locking organ 15 and after going round it its second part 8b advances from there to the locking organ 9b. In that case the push force F causes tensile load to the mentioned parts 8a, 8b the strengths of which depend on the direction of these parts in relation to the direction of the push force F. In this setting, it is possible to use in relation to the before mentioned examples a thinner fixing organ or correspondently greater push force F. The electric circuit can be set to advance according to the FIG. 5 so that only one of the parts of the fixing organ, in this example the first part 8a, belongs to the electric circuit when the current advances along the current wire 11 from the power source to the locking organ 9a and further along the first part 8a of the locking organ 15 and from there onwards along the current wire 12 to the current source or vice versa. In this application, it is possible to get the fixing organ 8 to break with a relatively less electric power than in the same size application with fixing organ of one part. This two part fixing organ 8 can also be made so that the current is set to go through the whole fixing organ, in other words from the locking organ 9a via the locking organ 15 to the locking organ 9b. In these applications, it is easier to set the spring 6 tense than earlier in the stated applications. It should be noticed that in this solution model the parts 8a, 8b of the fixing organ can possibly be essentially in different directions in relation to the push force F in which case the tensile strength of the part to be cut of the fixing organ 8 is made weaker to be less than by the push force F caused tensile load. The fixing organ 8 can consist of more than two parts of the kind that has been mentioned.

Figure 6:
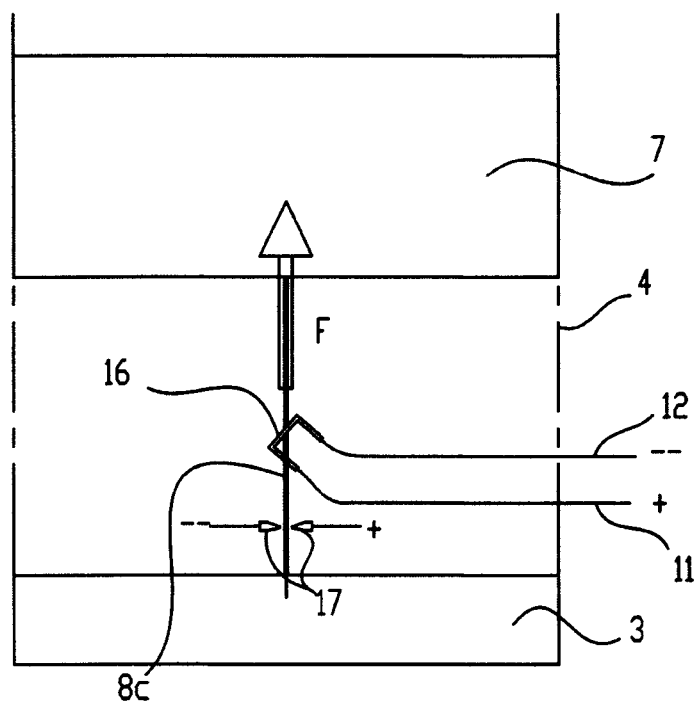
FIG. 6 presents one application of the invention that is different than the before mentioned ones.

The invention can also be applied in such a way that the fixing organ to be cut is burned or melted broken using the temperature of the electric resistance that has been installed to it or by the temperature of the electric arc between the terminals. There has been described in FIG. 6 a setting where there is an electric resistance 16 put against the fixing organ 8c. This electric resistance is a so called permanent resistance that means that it can be used many times. When the current is conducted through the electric resistance 16 its temperature rises and this causes the weakening of the tensile strength of the fixing organ by heating, burning or melting it. Another before mentioned with this comparable solution is thus to put the terminals 17 to replace the electric resistance 16 where there will occur an electric arc between them when the electric circuit is closed. In this case, the electric energy of the electric arc damages the fixing organ 8c and the fixing organ breaks when its tensile strength gets weaker than the pushing force F of the spring or weaker than the tensile load caused by the fixing organ of the pushing force. The fixing organ 8 can be a wire, metal cord, bar, strip, rope, line that conducts electricity well or badly or a corresponding organ or a combination of the before listed or any organ the strength of which can be weakened in the before mentioned way.

The intensity I and the voltage U of the electric current that is used can in all cases be set suitable and favorable case by case so that the energy that is needed for the breaking of the fixing organ 8, 8c can be achieved sufficiently quickly.

It should be noticed that even though in this description it has been kept to one for the invention favorable realization example this does not, however, want to limit the usage of the invention to only this type of examples, instead, many variations are possible within the inventive idea described in the claims.

The invention claimed is:

1. A method to launch an object from a flying apparatus comprising a container having at least a bottom, and a shell, said method comprising the steps of:
   a. placing a push spring against the bottom of the container;
   b. loading the spring into a tense state so that its push force is directed toward the intended launching direction of the object;
   c. locking the tense state of the spring with a fixing organ and directing tensile load of the push force to the fixing organ, said fixing organ being a thread, metal cord, bar, strip, rope, line or a combination thereof, comprising at least a part that is made of electricity conducting material and the fixing organ having a tensile strength greater than the tensile load directed to the fixing organ by the push force of the spring;
   d. inserting the object to be launched into the container as an extension of the spring; and
   e. weakening the tensile strength of the fixing organ to less than the tensile load of the spring in same spot by heating, burning or melting the fixing organ by using electric energy, causing the fixing organ to break, the spring to expand into the direction of the object and the push force of the spring to push the object out of the container and launching it from the flying apparatus;
wherein in step e) the heating, burning or melting the fixing organ is caused by conducting electric current through the part made of electricity conducting material of the fixing organ when electric energy changes into heat in the fixing organ, causing temperature in the part made of electricity conducting material to rise so much that the tensile strength goes down to less than the tensile load caused by push force of the spring in same spot.

2. The method according to the claim 1, wherein the bottom of the container and the push organ are made of isolating, poorly electricity conducting material.

3. The method of claim 1, wherein at least two terminals are installed in connection with the fixing organ and electricity is conducted via the terminals causing formation of an electric arc between the terminals, said arc having heat energy which increases the temperature of the of the fixing organ.

4. An apparatus to launch an object from a flying apparatus:
   wherein the apparatus has a container comprising at least a bottom and a shell push organ in the container;
   a spring tensed between the push organ and the bottom;
   a fixing organ maintaining a push force of the spring;

wherein only a part of the fixing organ is a part of an electric circuit or the fixing organ is disposed between terminals of the electric circuit; and wherein the electric circuit generates electricity so as to generate heat energy that weakens tensile strength of the fixing organ to an extent that the tension strength of the fixing organ becomes weaker than a tension load of the push force of the spring.

5. The apparatus according to the claim 4, wherein the shell is a cylinder.

6. The apparatus according to the claim 4, wherein the spring is a helical spring.

7. The apparatus according to claim 4, wherein the electric circuit comprises at least a part of the fixing organ, a locking organ, current cables, and a power supply and is equipped with a disconnector.

8. The apparatus according to the claim 7, wherein the disconnector has been set to close the electric circuit automatically by a signal coming from the acceleration, position, or pressure sensor or by remote control.

* * * * *